United States Patent
Li (10) Patent No.: US 10,755,393 B2
(45) Date of Patent: Aug. 25, 2020

(54) IMAGE NORMALIZATION METHOD AND IMAGE PROCESSING DEVICE

(71) Applicant: Acer Incorporated, New Taipei (TW)

(72) Inventor: Hsien-Yang Li, New Taipei (TW)

(73) Assignee: Acer Incorporated, New Taipei (TW)

( * ) Notice: Subject to any disclaimer, the term of this patent is extended or adjusted under 35 U.S.C. 154(b) by 0 days.

(21) Appl. No.: 16/285,242

(22) Filed: Feb. 26, 2019

(65) Prior Publication Data

US 2020/0167902 A1 May 28, 2020

(30) Foreign Application Priority Data

Nov. 23, 2018 (TW) .............................. 107141912 A (51) Int. Cl.
| | | |
|---|---|---|
| G06T 7/00 | (2017.01) | |
| G06T 5/00 | (2006.01) | |
| G06K 9/62 | (2006.01) | |
| G06N 3/08 | (2006.01) | |
| G06K 9/00 | (2006.01) | |
| G06T 5/40 | (2006.01) | |

(52) U.S. Cl.
CPC ................ G06T 5/009 (2013.01); G06T 5/40 (2013.01); *G06T 2207/10056* (2013.01); *G06T 2207/20081* (2013.01); *G06T 2207/20208* (2013.01)

(58) Field of Classification Search
CPC . G06T 5/009; G06T 5/40; G06T 2207/10056; G06T 2207/20081; G06T 2207/20208
See application file for complete search history.

(56) References Cited

U.S. PATENT DOCUMENTS

| | | | |
|---|---|---|---|
| 2005/0007364 A1 | 1/2005 | Oyama et al. | |
| 2005/0266395 A1* | 12/2005 | Gholap | G01N 33/5091 435/4 |
| 2014/0233826 A1* | 8/2014 | Agaian | G16H 50/30 382/133 |

FOREIGN PATENT DOCUMENTS

| | | |
|---|---|---|
| CN | 103020585 | 4/2013 |
| CN | 104412097 | 3/2015 |
| EP | 1887517 | 2/2008 |
| TW | 201723466 | 7/2017 |
| TW | 201832181 | 9/2018 |
| WO | 2005076197 | 8/2005 |

OTHER PUBLICATIONS

Rafael C. Gonzalez and Richard E. Woods, "Digital Image Processing," 2002, Prentice Hall, 2nd Edition, p. 712-732 (Year: 2002).*

(Continued)

*Primary Examiner* — Sing-Wai Wu
(74) *Attorney, Agent, or Firm* — JCIPRNET (57) ABSTRACT

An image normalization method and an image processing device are provided. The image processing method includes: obtaining an input image; performing a cell visualization operation on each pixel of the input image, wherein the cell visualization operation generates an output value of each pixel of the input image according to an input value of each pixel of the input image, a color distribution center corresponding to at least one cell, a contrast adjustment value, and a brightness adjustment value.

8 Claims, 6 Drawing Sheets

(56) References Cited

OTHER PUBLICATIONS

Siwei Lyu and Eero P. Simoncelli, "Nonlinear Image Representation Using Divisive Normalization," Jun. 23-28, 2008, IEEE Conference on Computer Vision and Pattern Recognition, IEEE Xplore: Aug. 5, 2008 (Year: 2008).*
"Search Report of Europe Counterpart Application," dated Sep. 18, 2019, pp. 1-9.
M.K. Osman et al., "Contrast Enhancement for Ziehl-Neelsen Tissue Slide Images using Linear Stretching and Histogram Equalization Technique," 2009 IEEE Symposium on Industrial Electronics & Applications(ISIEA 2009), Oct. 4-6, 2009, pp. 431-435.

* cited by examiner

IMAGE NORMALIZATION METHOD AND IMAGE PROCESSING DEVICE

CROSS-REFERENCE TO RELATED APPLICATION

This application claims the priority benefit of Taiwan application serial no. 107141912, filed on Nov. 23, 2018. The entirety of the above-mentioned patent application is hereby incorporated by reference herein and made a part of this specification.

BACKGROUND OF THE INVENTION

Field of the Invention

The invention is related to an image normalization method and an image processing device, and more particularly, to an image normalization method and an image processing device for visually displaying a cell.

Description of Related Art

The microscopic image acquisition of circulating cancer cells mainly includes placing a stained sample of blood cells on a glass slide and photographing the sample with a microscope. However, the difference in brightness between the stained area and the unstained area on the microscope image is very large. In addition, the brightness of the stained cells is very similar to that of the stained area. If the cell image is not processed first, then the color difference between the stained cells and the stained background area cannot be distinguished because the brightness of the stained area is too low. Therefore, how to perform image processing on stained samples of cells to visually display cells is an object that those skilled in the art should strive for.

SUMMARY OF THE INVENTION

The invention provides an image normalization method and an image processing device performing image processing on stained samples of cells to visually display cells.

The invention provides an image normalization method adapted to visually display at least one cell from an input image. The input image includes a stained area and an unstained area. At least one cell is located in the stained area. The image normalization method includes the following steps. An input image is obtained. A cell visualization operation is performed on each pixel of the input image, wherein the cell visualization operation generates an output value of each pixel of the input image according to an input value of each pixel of the input image, a color distribution center corresponding to at least one cell, a contrast adjustment value, and a brightness adjustment value. An output image is generated according to the output value of each pixel of the input image to be displayed on a display or entered into an artificial intelligence (AI) model or a deep-learning model as training data or input data.

In an embodiment of the invention, the cell visualization operation generates an output value of each pixel of the input image according to an equation $$y = \left(\frac{1}{1+e^{c \times (1-\frac{x}{t})}}\right)^{\gamma},$$

wherein e is Euler's number, y is the output value, C is the contrast adjustment value, γ is the brightness adjustment value, t is the color distribution center, and x is the input value.

In an embodiment of the invention, the color distribution center is the peak position of a cell distribution in a histogram of the input image.

In an embodiment of the invention, the color distribution center is obtained by a machine learning or deep-learning method according to a histogram feature of the input image.

In an embodiment of the invention, the output value is between 0 and 1.

The invention provides an image processing device including a storage device storing an input image; a display; and a processor coupled to the storage device and the display. The processor obtains an input image. The processor performs a cell visualization operation on each pixel of the input image, wherein the cell visualization operation generates an output value of each pixel of the input image according to an input value of each pixel of the input image, a color distribution center corresponding to at least one cell, a contrast adjustment value, and a brightness adjustment value. The processor generates an output image for display on the display according to the output value of each pixel of the input image.

In an embodiment of the invention, the cell visualization operation generates the output value of each pixel of the input image according to an equation $$y = \left(\frac{1}{1+e^{c \times (1-\frac{x}{t})}}\right)^{\gamma},$$

wherein y is the output value, C is the contrast adjustment value, γ is the brightness adjustment value, t is the color distribution center, and x is the input value.

In an embodiment of the invention, the color distribution center is the peak position of a cell distribution in a histogram of the input image.

In an embodiment of the invention, the color distribution center is obtained by a machine learning or deep-learning method according to a histogram feature of the input image.

In an embodiment of the invention, the output value is between 0 and 1.

Based on the above, the image normalization method and the image processing device of the invention may perform a cell visualization operation according to an input value of each pixel of the input image, a color distribution center corresponding to at least one cell, a contrast adjustment value, and a brightness adjustment value to generate an output image and display the output image on a display.

In order to make the aforementioned features and advantages of the disclosure more comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
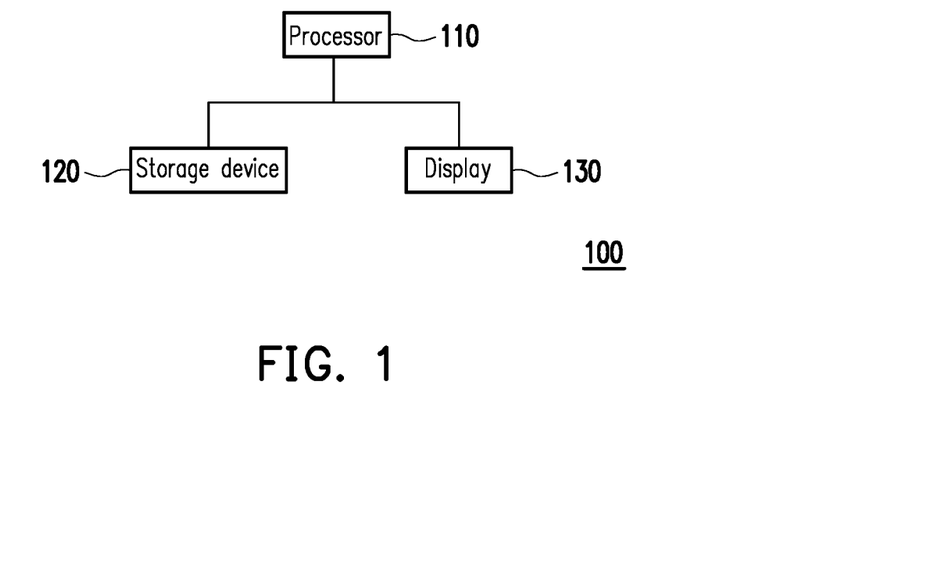
FIG. 1 is a block diagram of an image processing device according to an embodiment of the invention.

FIG. 1 is a block diagram of an image processing device according to an embodiment of the invention.

Referring to FIG. 1, an image processing device 100 of an embodiment of the invention includes a processor 110 and a storage device 120 and a display 130 coupled to the processor 110. The storage device 120 may store an input image. The input image includes a stained area and an unstained area and cells are located in the stained area. The cells may include circulating cancer cells and other cells in the blood. The processor 110 may perform a cell visualization operation on the input image to generate an output image and display the output image on the display 130 so that the human eye may recognize the stained cells of the output image.

The processor 110 may be a central processing unit (CPU) or a general-purpose or special-purpose programmable microprocessor, digital signal processor (DSP), programmable controller, application-specific integrated circuit (ASIC), other similar devices, or a combination of the above devices, but the invention is not limited thereto.

The storage device 120 may be any form of a fixed or movable random-access memory (RAM), read-only memory (ROM), flash memory, hard disk drive (HDD), solid-state drive (SSD), similar devices, or a combination of the above devices.

Figure 2:
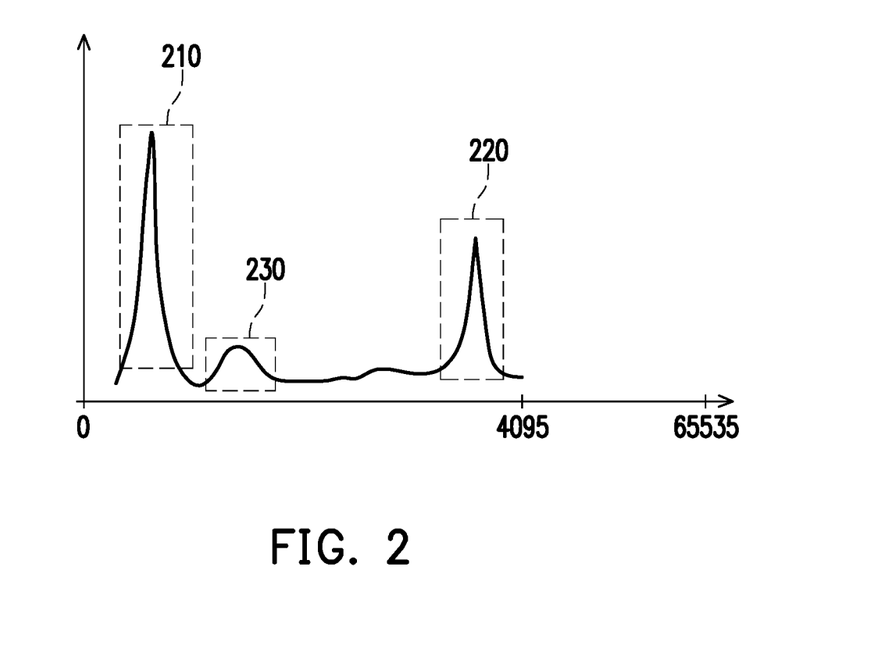
FIG. 2 is a schematic of a histogram of an input image according to an embodiment of the invention.

FIG. 2 is a schematic of a histogram of an input image according to an embodiment of the invention.

Referring to FIG. 2, in the histogram of the input image, the horizontal axis is the brightness and the vertical axis is the number of pixels. In an embodiment, the brightness information of the input image is stored in 12 bits (e.g., brightness range of 0 to 4095), and the brightness information of the output image is stored in 16 bits (e.g., brightness range of 0 to 65535). The histogram of FIG. 2 includes a stained background 210 having the lowest brightness, an unstained area 220 having the highest brightness, and stained cells 230 having a slightly higher brightness than the stained background 210. Since the brightness of the stained cells 230 and the stained background 210 are too similar, the human eye cannot distinguish the color difference between the stained cells 230 and the stained background 210.

Figure 3:
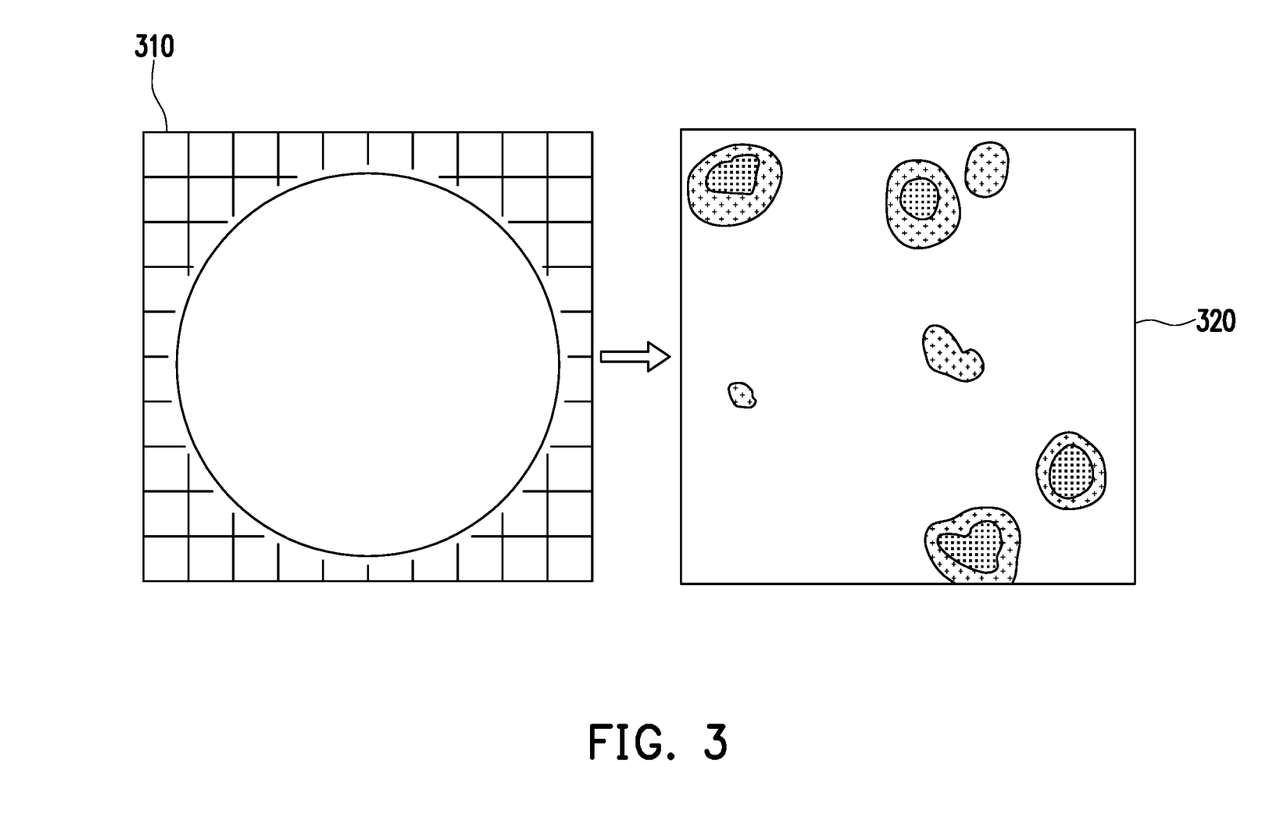
FIG. 3 is a schematic of an output image generated by performing histogram equalization on an input image according to an embodiment of the invention.

In an embodiment, the processor 110 may perform histogram equalization on the input image to generate an output image, as shown in FIG. 3. FIG. 3 shows an output image 310 generated by performing histogram equalization on the input image and a partially enlarged view 320 of the output image 310. As may be seen from the partially enlarged view 320, the color distributions of the stained cells 230 and the stained background 210 are too similar and the output image 310 has a large unstained area 220, resulting such that the image brightness of the output image 310 is too high and a large amount of noise is generated.

Figure 4:
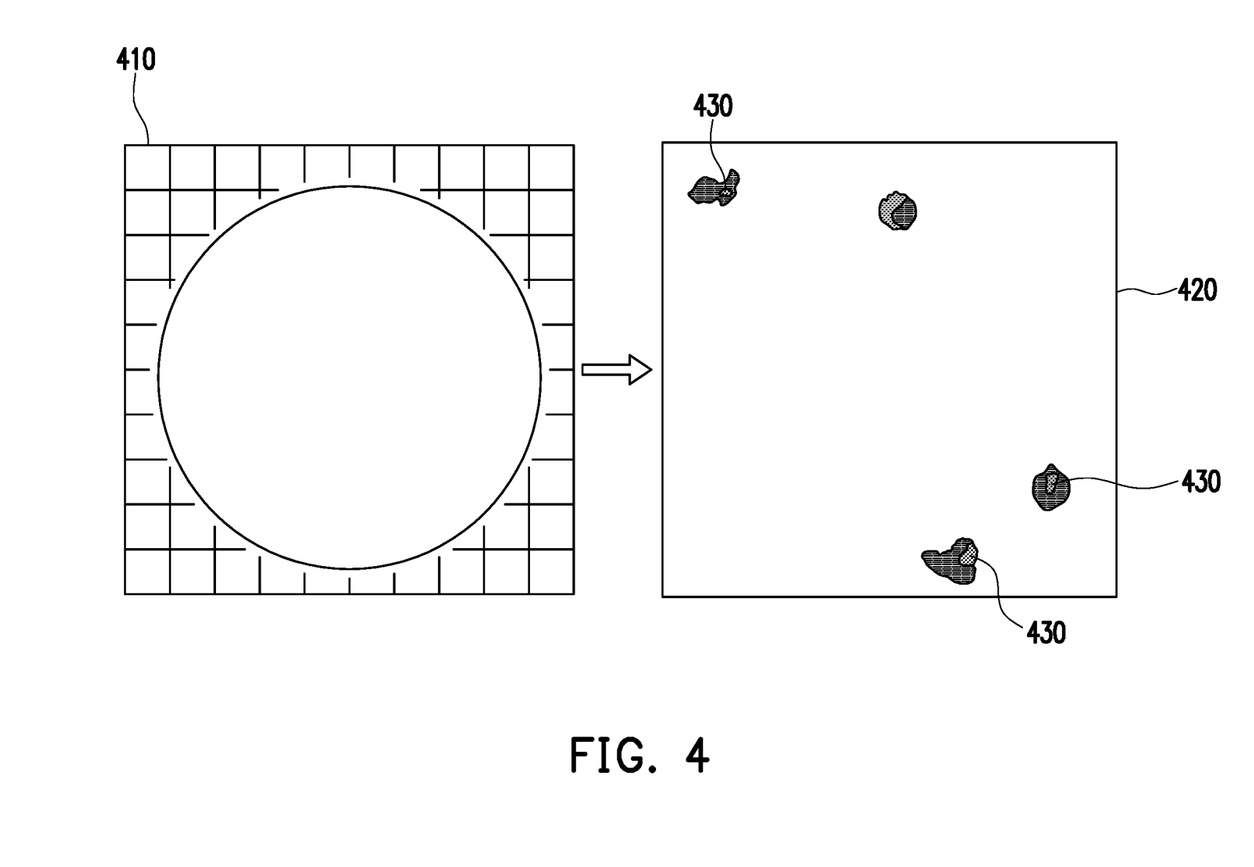
FIG. 4 is a schematic of an output image generated by performing histogram equalization and gamma correction on an input image according to an embodiment of the invention.

In an embodiment, the processor 110 may perform histogram equalization and gamma correction on the input image to generate an output image, as shown in FIG. 4. FIG. 4 shows an output image 410 generated by performing histogram equalization and gamma correction on the input image and a partially enlarged view 420 of the output image 410. As may be seen from the output image 410 and the partially enlarged view 420, performing histogram equalization and gamma correction on the input image solves the issue of excessive brightness and suppresses some noise, but cell information is still easily lost.

Figure 5:
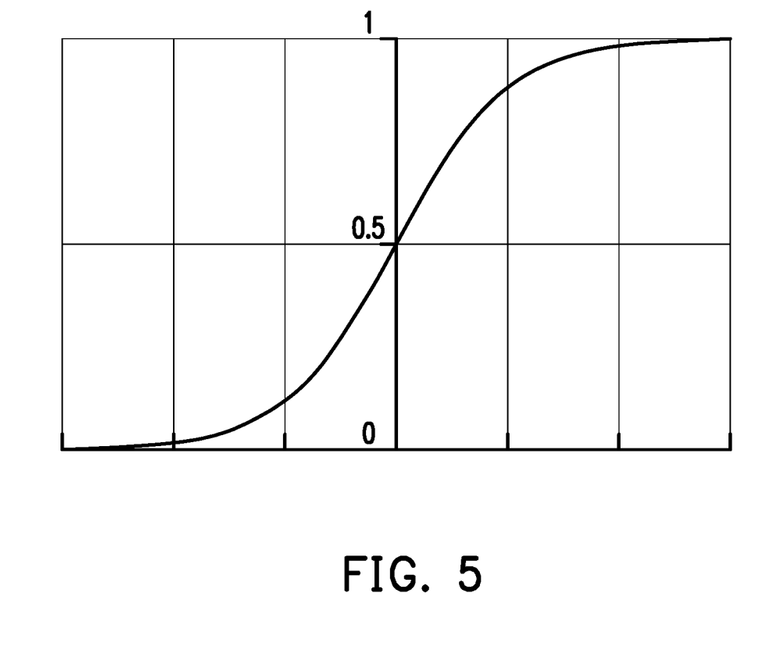
FIG. 5 is a schematic of converting an input value to an output value by a first equation according to an embodiment of the invention.

In an embodiment, the processor 110 may operate on each pixel of the input image according to the first equation $$\alpha = \frac{1}{1+e^{-k}}.$$

$\alpha$ is the output value and k is the input value. The result of the operation is shown in FIG. 5. In FIG. 5, each input value of the horizontal axis corresponds to an output value between 0 and 1 of the vertical axis via the above equation. When the input value is too large, the output value approaches 1 and when the input value is too small, the output value approaches 0. Using the mathematical properties of the first equation, an effect similar to filtering the parts of the image that are too bright and too dark using two threshold values may be achieved.

In an embodiment, the processor 110 may perform a cell visualization operation on each pixel of the input image. The cell visualization operation generates an output value corresponding to each pixel of the input image according to the second equation $$y = \left(\frac{1}{1+e^{c \times \left(1-\frac{x}{t}\right)}}\right)^{\gamma}.$$

In the second equation, y is the output value, C is the contrast adjustment value, γ is the brightness adjustment value, t is the color distribution center, and X is the input value. The "1" of "1-x/t" in the second equation is to ensure that the output is always 0.5 when x=t and γ=1 regardless of the value of t, that is, at the center point of the vertical axis of FIG. 5. In an embodiment, the color distribution center is the peak position of a cell distribution in a histogram of the input image (i.e., the horizontal axis value of the peak of the stained cells 230). In another embodiment, the color distribution center is obtained by a machine learning or deep-learning method according to a histogram feature of the input image. In another embodiment, the color distribution center may also be set according to empirical rules. The closer the color distribution center is to the intermediate value of the plurality of input values of the stained cells 230, the easier it is for the user to recognize the cells from the output image. It is worth noting that the output value y is between 0 and 1. In an embodiment, after the output value y is calculated, the processor 110 converts the output value y into a brightness value ranging from 0 to 65535 to generate the output image.

The processor 110 may simultaneously filter areas of the input image that are too bright (e.g., the unstained area 220) and too dark (e.g., the stained background 210) via the second equation and retain and amplify important information of the stained cells 230 via the color distribution center t and the contrast adjustment value C. In addition, the processor 110 may also adjust the overall brightness of the output image via the brightness adjustment value γ.

Figure 6:
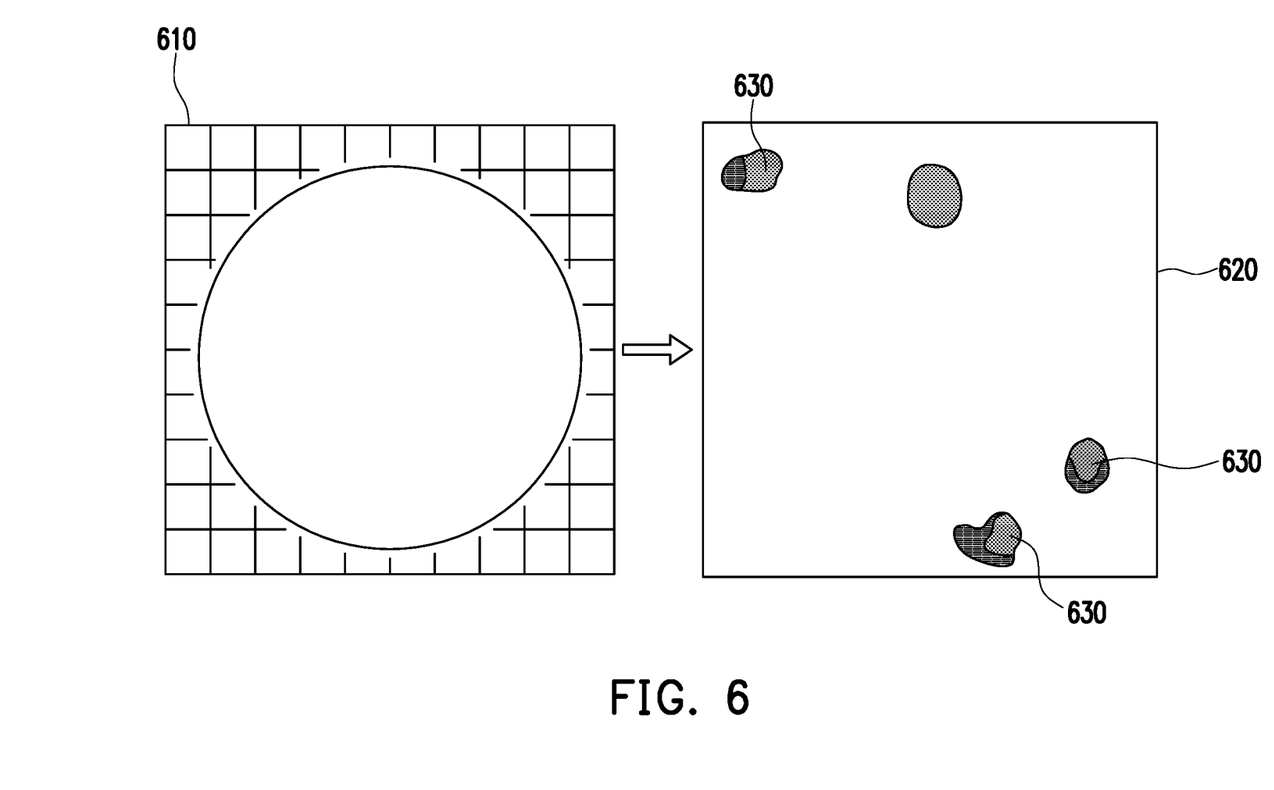
FIG. 6 is a schematic of an output image generated by a second equation according to an embodiment of the invention.

The output image generated according to the second equation is shown in FIG. 6. FIG. 6 is an output image 610 generated by performing a cell visualization operation on an input image and a partially enlarged view 620 of the output image 610. In the partially enlarged view 620, a cell information 630 is more completely retained than a cell information 430 of FIG. 4.

Figure 7:
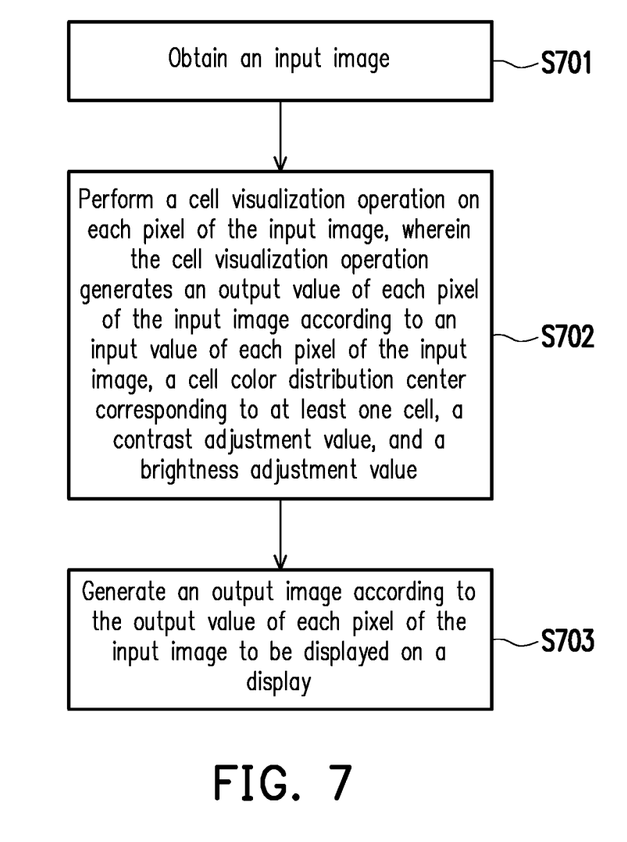
FIG. 7 is a flowchart of an image normalization method according to an embodiment of the invention.

FIG. 7 is a flowchart of an image normalization method according to an embodiment of the invention.

Referring to FIG. 7, in step S701, an input image is obtained.

In step S702, a cell visualization operation is performed on each pixel of the input image, wherein the cell visualization operation generates an output value of each pixel of the input image according to an input value of each pixel of the input image, a color distribution center corresponding to at least one cell, a contrast adjustment value, and a brightness adjustment value.

In step S703, an output image is generated for display on a display according to the output value of each pixel of the input image.

Based on the above, the image normalization method and the image processing device of the invention may perform a cell visualization operation according to an input value of each pixel of the input image, a color distribution center corresponding to at least one cell, a contrast adjustment value, and a brightness adjustment value to generate an output image, and the output image is displayed on a display or entered into an AI model or a deep-learning model as training data or input data. Via the cell visualization operation, areas of the input image that are too bright and too dark may be filtered, and important information of the cells is retained and enlarged, making it easier for the user to recognize cells from the output image.

Although the invention has been described with reference to the above embodiments, it will be apparent to one of ordinary skill in the art that modifications to the described embodiments may be made without departing from the spirit of the invention. Accordingly, the scope of the invention is defined by the attached claims not by the above detailed descriptions.

What is claimed is:

1. An image normalization method adapted to visually display at least one cell from an input image, wherein the input image comprises a stained area and an unstained area, and the at least one cell is located in the stained area, the image normalization method comprising:
   obtaining the input image; and
   performing a cell visualization operation on each pixel of the input image, wherein the cell visualization operation generates an output value of each of the pixels of the input image according to an input value of each of the pixels of the input image, a color distribution center corresponding to the at least one cell, a contrast adjustment value, and a brightness adjustment value,
   wherein the cell visualization operation generates the output value of each of the pixels of the input image according to an equation $$y = \left( \frac{1}{1 + e^{c \times \left(1 - \frac{x}{t}\right)}} \right)^{\gamma},$$

wherein e is Euler's number, y is the output value, C is the contrast adjustment value, γ is the brightness adjustment value, t is the color distribution center, and x is the input value.

2. The image normalization method of claim 1, wherein the color distribution center is a peak position of a cell distribution in a histogram of the input image.

3. The image normalization method of claim 1, wherein the cell color distribution center is obtained by a machine learning or deep-learning method according to a histogram feature of the input image.

4. The image normalization method of claim 1, wherein the output value is between 0 and 1.

5. An image processing device, comprising:
   a storage device storing an input image;
   a display; and
   a processor coupled to the storage device and the display, wherein
   the processor obtains the input image;
   the processor performs a cell visualization operation on each pixel of the input image, wherein the cell visualization operation generates an output value of each of the pixels of the input image according to an input value of each of the pixels of the input image, a color distribution center corresponding to the at least one cell, a contrast adjustment value, and a brightness adjustment value;
   the processor generates an output image for display on the display according to the output value of each of the pixels of the input image,
   wherein the cell visualization operation generates the output value of each of the pixels of the input image according to an equation $$y = \left( \frac{1}{1 + e^{c \times \left(1 - \frac{x}{t}\right)}} \right)^{\gamma},$$

wherein e is Euler's number, y is the output value, C is the contrast adjustment value, γ is the brightness adjustment value, t is the color distribution center, and x is the input value.

6. The image processing device of claim 5, wherein the color distribution center is a peak position of a cell distribution in a histogram of the input image.

7. The image processing device of claim 5, wherein the color distribution center is obtained by a machine learning or deep-learning method according to a histogram feature of the input image.

8. The image processing device of claim 5, wherein the output value is between 0 and 1.

* * * * *